United States Patent [19]

Gierer

[11] Patent Number: 5,722,913

[45] Date of Patent: Mar. 3, 1998

[54] PROCESS FOR CONTROLLING AN AUTOMATIC GEARBOX

[75] Inventor: Georg Gierer, Kressbronn, Germany

[73] Assignee: ZF Friedrichshafen AG, Friedrichshafen, Germany

[21] Appl. No.: 693,119

[22] PCT Filed: Feb. 18, 1995

[86] PCT No.: PCT/EP95/00595

§ 371 Date: Aug. 16, 1996

§ 102(e) Date: Aug. 16, 1996

[87] PCT Pub. No.: WO95/23303

PCT Pub. Date: Aug. 31, 1995

[30] Foreign Application Priority Data

Feb. 23, 1994 [DE] Germany ............... 44 05 806.3

[51] Int. Cl.⁶ .................................................. F16H 61/08
[52] U.S. Cl. .................... 477/148; 477/120; 477/149; 477/155
[58] Field of Search ........................... 477/148, 143, 477/144, 149, 155, 120

[56] References Cited

U.S. PATENT DOCUMENTS

| | | | |
|---|---|---|---|
| 4,942,530 | 7/1990 | Boda et al. ............... | 364/424.1 |
| 5,014,575 | 5/1991 | Fujiwara et al. ............ | 477/149 |
| 5,251,509 | 10/1993 | Pollack et al. .............. | 477/155 |
| 5,282,401 | 2/1994 | Hebbale et al. . | |
| 5,393,279 | 2/1995 | Bota et al. ................. | 477/143 |
| 5,460,583 | 10/1995 | Kitada et al. ............... | 477/148 |
| 5,468,198 | 11/1995 | Holbrook et al. ........... | 477/144 |
| 5,547,437 | 8/1996 | Kamada et al. ............. | 477/143 |
| 5,551,930 | 9/1996 | Creger et al. ............... | 477/143 |

FOREIGN PATENT DOCUMENTS 40 23 365  1/1992  Germany .

Primary Examiner—Charles A. Marmor
Assistant Examiner—Sherry Lynn Estremsky
Attorney, Agent, or Firm—Davis and Bujold

[57] ABSTRACT

A process is proposed for controlling an automatic transmission wherein a transition occurs from a first, lower reduction step to a second, higher reduction step when a first clutch disengages and a second clutch engages and a synchronizer speed is calculated by multiplying the transmission output speed by the reduction ratio of the second reduction step. A speed value, at which the pressure increase of the second clutch begins, is assigned to the synchronizer speed from a characteristic curve. The characteristic curve is adapted if the transmission input speed exceeds the synchronizer speed or if the gradient of the transmission input speed exceeds a limit value.

8 Claims, 2 Drawing Sheets

PROCESS FOR CONTROLLING AN AUTOMATIC GEARBOX

BACKGROUND OF THE INVENTION

In automatic transmissions a transition from a first lower reduction step to a second higher reduction step (downshift) occurs when a first clutch disengages and a second clutch engages. The start of the pressure increase in the second clutch and the pressure achieved at the end of the gearshift are selected here so that the second clutch reliably takes up the torque to be transmitted at the synchronization point. The synchronization point is calculated by multiplying the actual transmission output speed by the reduction ratio of the second reduction step. A displacement of the take-up point can result from disturbance variables. Disturbance variables are, for example: tolerances of mechanical parts, temperature influence of the pressure medium, scattering of the friction value of the clutch discs and change of the friction value during the useful life of the transmission. The disturbance variables act upon both clutches. A displacement of the take-up point produces a clear impairment of the ease in gearshifting. Along with the disturbance variables related to the transmission, the power output of the internal combustion engine also influences the ease in gearshifting. The power output of identical internal combustion engines is known to disperse within the series.

DE-OS 40 23 365 has disclosed a process for gearshifting an automatic multi-step change transmission. The process relates to a downshift. After disengagement of a first clutch, a second clutch is engaged after a time step has elapsed. An impairment in gearshift ease is detected by evaluating torque-dependent parameters such as misalignment of the engine and transmission unit or speed change of the transmission output speed. If said parameters exceed a limit value, the time step is adapted.

SUMMARY OF THE INVENTION

The problem on which the invention is based is to ensure a steady ease in gearshifting during downshifts.

According to the invention the solution of the problem involves two possibilities: in a first possible solution it is assumed that a transmission input speed runs past the synchronization point. According to the invention, transmission input speed is to be understood as the speed of the turbine wheel of a hydrodynamic converter. For the above mentioned case it is proposed that a speed value, at which the pressure begins to increase in the second clutch, be assigned from a characteristic curve to a synchronizer speed value, and the characteristic curve be adapted when the transmission input speed is higher than the synchronizer speed value. In development of this, it is proposed that the characteristic curve be adapted so that the assigned speed value after the adaptation is greater than the assigned speed value prior to the adaptation for the same synchronizer speed value. Another development provides that at a first moment, a first gradient of the transmission input speed and at a second moment, a second gradient of the transmission input speed be cyclically determined, and upon a change of signs of the gradients from plus to minus, the input speed value at the second moment be set as a maximum.

In a second possible solution it is proposed that a speed value, at which begins the pressure increase of the second clutch, be assigned from a characteristic curve, to a synchronizer speed value, that at a first moment, a first gradient and at a second moment, a second gradient of the transmission input speed be determined, that a difference be calculated of the second gradient minus the first gradient, that the characteristic curve be adapted when the difference exceeds a limit value and that the transmission input speed at the second moment be set as a minimum. In development of this, it is proposed that the characteristic curve be adapted so that the assigned speed value after the adaptation is less than the assigned speed value prior to the adaptation for the same synchronizer speed. In this solution it is assumed that the transmission input speed at the take-up point is lower than the calculated synchronizer speed so that the clutch increases the transmission input speed to the synchronizer speed. This is the case when the internal combustion engine delivers too little power or when the disengaging clutch still has not been fully disengaged.

Both solutions according to the invention offer the advantage that the pressure increase of the second clutch begins depending on eventualities. The starting point of the pressure decrease is a function of the transmission input speed. The adaptation has the effect that a divergence of the take-up point of the second clutch from the synchronizer point is eliminated for the successive gearshifts.

In development of the invention, it is proposed that a difference be calculated of the maximum transmission input speed minus the synchronizer speed value, or minimum transmission input speed minus the synchronizer speed value. The difference is summed up in a store and the characteristic curve is adapted when the sum exceeds a positive limit value or falls below a negative limit value. The advantage obtained by the summing up is that the adaptation operates only in case of continued divergence of the take-up point. The upper limit is only exceeded when during several gearshifts the take-up point occurs at a higher transmission input speed than the synchronization point. In reaction to exceeding the upper limit value, the characteristic curve is adapted so that the assigned speed value after the adaptation is greater than the assigned speed value prior to the adaptation for the same synchronizer speed value. The speed value is assumed to be a relative value to the synchronization point. Relative value means, for example, 500 revolutions before the synchronization point. By virtue of the adaptation, the start of pressure decrease of the second clutch thus changes to a lower transmission input speed value. When falling below the negative limit value, the characteristic curve is adapted so that the assigned speed value after the adaptation is less than the assigned speed value prior to the adaptation for the same synchronizer speed value. As a result of the adaptation, the start of pressure decrease of the second clutch thus changes to a higher transmission input value. After the adaptation has been effected, the store is set to zero. It is further proposed that the store content be set to zero if in a predetermined number of gearshifts, the difference of maximum minus synchronizer speed value or minimum minus synchronizer speed value is zero or almost zero. The advantage obtained hereby is that sporadic divergences do not necessarily lead to adaptation of the characteristic curve. If during several successive gearshifts there is no divergence, or only a slight divergence, from the synchronization point, then the value from the sporadic divergence is canceled.

In another development it is proposed that from an assemblage of characteristic curves, one characteristic curve be selected in accordance with the temperature range of the transmission oil, speed range of the transmission input speed at the start of the gearshift, reduction ratio of the first reduction step and driving time portion in the first reduction step.

As an initial condition for adaptation it is proposed that a change of a throttle valve signal be smaller than a limit value, that no traction/thrust or vice versa occur during the gearshift and that a transmission oil temperature be higher than a limit value.

BRIEF DESCRIPTION OF THE DRAWINGS

Embodiments of the control process are shown in the drawing in which.

DESCRIPTION OF THE PREFERRED EMBODIMENT

Figure 1:
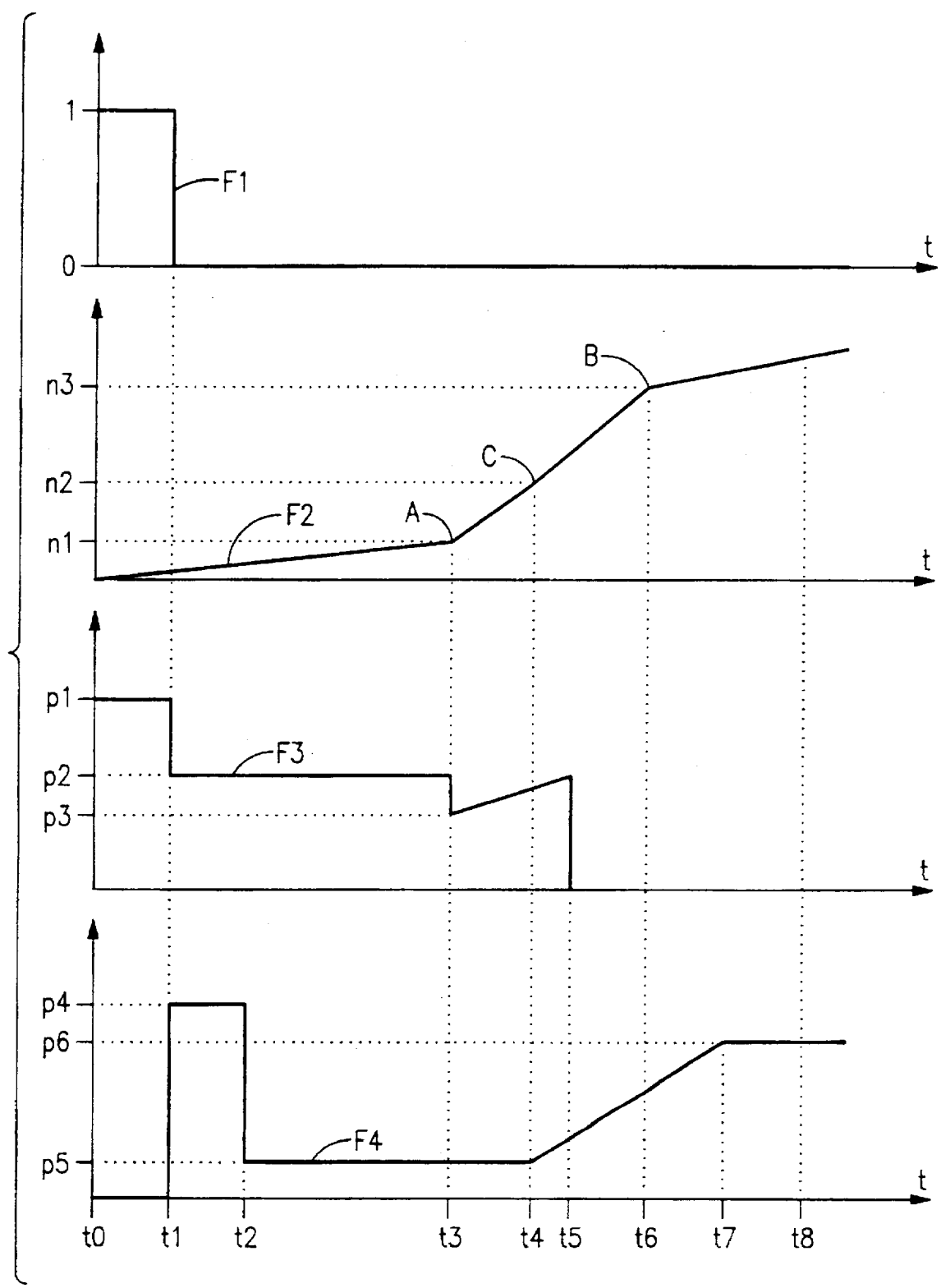
FIG. 1 is a time diagram for a gearshift.

In FIG. 1, a change is shown from a first reduction step to a second reduction step. F1 designates the curve of an electromagnetic valve, F2 designates the curve of the transmission input speed, F3 the pressure curve of the first clutch and F4 the pressure curve of the second clutch. The curve F4 consists of: quick-loading phase, load differential phase, pressure decrease ramp and change to end pressure.

The gearshift starts at the t1 moment with issuance of the shift command by the electromagnetic valve, F1 goes over from 1 to 0. With the issuance of the shift command the pressure on the first clutch decreases from an initial value p1 to the new value p2. The second clutch is simultaneously actuated within the. time period t1 to t2 with high pressures p4, the quick-loading pressure. The second clutch is preloaded by the quick-loading pressure. After the quick-loading phase, at the t2 moment, the load differential phase of the second clutch begins. In the load differential phase the second clutch is loaded with the pressure medium, pressure height p5. The load differential phase is terminated at t4. At the t4 moment a clutch contact component abuts on the friction components of the clutch. Still no torque has been transmitted. During the load differential phase, at the t3 moment, the pressure on the first clutch is reduced from the pressure value p2 to p3. Thereby the engine can freely increase speed or the transmission input speed rises more sharply, point A. At point C, the transmission input speed exceeds the speed value n2. Upon exceeding the speed value n2, the pressure increase in the second clutch is started, moment t4. The Speed value n2 results from the calculated speed value of the synchronization point of the second clutch and a speed value assigned to the synchronization point from a characteristic curve. The speed value is preset as a relative value to the synchronization point. Relative value means, for example, 500 revolutions before the synchronization point. In FIG. 1 this is the speed difference n3–n2. The synchronization point is calculated from the transmission output speed multiplied by the reduction ratio of the second reduction step. Hereby the calculation of the synchronization point is updated during the gearshift. Point B designates the calculated synchronizer speed value n3. At t5 the first clutch disengages completely. At the t6 moment the transmission input speed has reached the synchronizer speed value n3, point B. At point B, the second clutch has completely taken up the torque. The second clutch reaches the pressure end value p6 at the t7 moment. The pressure end value p6 is selected so that the second clutch can reliably transmit the torque. The transition terminates at t8.

Figure 2:
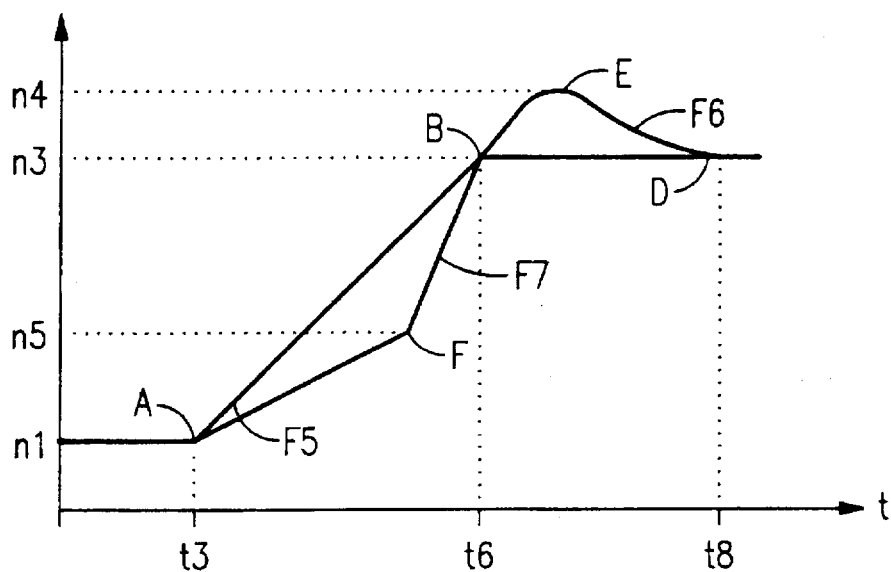
FIG. 2 is a transmission input speed curve for three different gearshifts.

In FIG. 2 is shown the curve of the transmission input speed for three different shifts from a first reduction step to a second reduction step: F5 with the points A, B and D designates an ideal curve of the transmission input speed. F6 with the points A, B, E and D designates a clutch having a take-up point which is after the synchronization point B. The transmission input speed thus exceeds the synchronizer speed value n3. The second clutch does not begin to take up the torque until point E. Since the transmission input speed at point E, speed value n4, is greater than the synchronization point, speed value n3, the second clutch towers the transmission input speed to the speed value n3. F7 with the points A, F, B and D shows a speed curve such as would result from lack of power delivery of the internal combustion engine or delayed disengagement of the first clutch. Thereby the gradient of the transmission input speed in the range between points A and F is smaller than the ideal curve. The second clutch takes up the torque at the point F. The transmission input speed value n5 at point F is lower than the speed value n3 of the synchronization point B. The second clutch raises the transmission input speed to the speed level n3. This makes itself apparent in a clear gradient change of the input speed.

Figure 3:
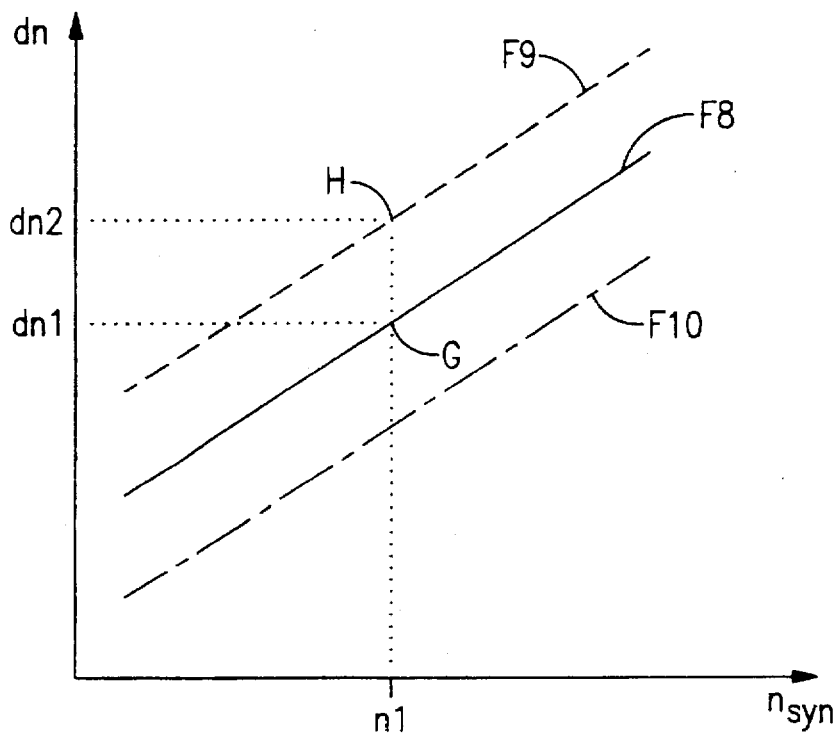
FIG. 3 is a characteristic curve of the adaptation.

FIG. 3 shows an adaptation characteristic curve. The speed of the synchronization point here forms the abscissa. The synchronization point results from the transmission output speed multiplied by the reduction ratio of the second reduction step. Speed values dn are plotted in the ordinate. A straight line function, shown designated with F8, assigns to an abscissa value n1 the corresponding ordinate value dn1, point G. The value dn1 establishes the start of the pressure increase of the second clutch, for example, dn1 corresponds to 500 revolutions, this meaning that the pressure reduction of the second clutch is 500 revolutions before the synchronization point. F9 shows the straight line moved parallel, to increased high dn values. Thereby a higher speed value dn2 is assigned to the synchronizer speed value n1. F9 thus characterizes the case of the transmission input speed going past the synchronization point, curve F6 in FIG. 2. F10 is a straight line moved parallel, to decreased speed values of dn. This is the case when the transmission input speed at the take-up point is lower than the synchronization point, curve F7 in FIG. 2. Reference numerals F1 curve of the solenoid valve
F2 curve of the transmission input speed
F3 pressure curve first clutch
F4 pressure curve second clutch
F5 ideal curve of transmission input speed
F6 transmission input speed curve affected by disturbance variables
F7 transmission input speed curve affected by disturbance variables
F8 adaptation characteristic curve
F9 adapted characteristic curve
F10 adapted characteristic curve

I claim:

1. A process for controlling an automatic transmission wherein a transition occurs from a first lower reduction step to a second higher reduction step when a first clutch disengages and a second clutch engages, a synchronizer speed is calculated by multiplying transmission output speed by a reduction ratio of the second reduction step, the process comprising the steps of:

assigning a differential speed value (dn) to the synchronizer speed value from a characteristic curve (F8);

beginning pressure increase of the second clutch at a speed value which results from the synchronizer speed value minus the differential speed value (dn); and adapting said characteristic curve (F8) when a transmission input speed exceeds the synchronizer speed value, said characteristic curve (F8) being adapted so that the assigned differential speed value (dn) after the adaptation is greater than the assigned differential speed value prior to the adaptation for the same synchronizer speed value (F9).

2. A process according to claim 1, further comprising the steps of:
   cyclically determining a first gradient of transmission input speed at a first moment, and a second gradient of transmission input speed at a second moment; and
   upon a change of sign of the gradients from plus to minus, assigning the input speed value at the second moment as a maximum.

3. A process according to claim 2, further comprising the steps of:
   calculating a difference of at least one of the maximum minus the synchronizer speed value and a minimum of the transmission input speed minus the synchronizer speed;
   summing up the difference in a store; and
   adapting the characteristic curve when the sum one of exceeds a positive limit value and falls below a negative limit value.

4. A process according to claim 1, further comprising the step of selecting one characteristic curve of an assemblage of characteristic curves, in accordance with a transmission oil temperature range speed range of the transmission input speed at the beginning of the reduction step transition, reduction ratio of the first reduction step and driving time portion in the first reduction step.

5. A process according to claim 1 further comprising the step of evaluating an adaptation only when during the reduction step transition a change of a throttle valve signal is smaller than a limit value, no one of traction/thrust change and thrust/traction change occurs and transmission oil temperature is higher than a limit value.

6. A process for controlling an automatic transmission wherein a transition occurs from a first lower reduction step to a second higher reduction step when a first clutch disengages (F3) and a second clutch engages (F4), a synchronizer speed results from multiplying a transmission output speed by the reduction ratio of the second reduction step, the process comprising the steps of:
   assigning a differential speed value (dn) to a synchronizer speed value from a characteristic curve (F8);
   beginning a pressure increase of the second clutch at a speed which results from the synchronizer speed value minus the differential speed value;
   at a first moment and at a second moment, determining a first gradient and a second gradient of transmission input speed (F2);
   calculating a difference of the second gradient minus the first gradient;
   adapting the characteristic curve (F8) when the difference exceeds a limit value; and
   assigning the transmission input speed at the second moment as a minimum, said characteristic curve (F8) being adapted in a manner such that the assigned differential speed value after the adaptation is less than the assigned differential speed value prior to the adaptation for the same synchronizer speed value (F10).

7. A process according to claim 6, further comprising the steps of:
   calculating a difference of at least one of a maximum of the transmission speed minus the synchronizer speed value and the minimum minus the synchronizer speed;
   summing up the difference in a store; and
   adapting the characteristic curve when the sum one of exceeds a positive limit value and falls below a negative limit value.

8. A process according to claim 7, further comprising the step of setting the store content to zero when, during a predetermined number of gearshifts, the difference between one of the maximum of the transmission input speeds minus synchronizer speed value and the minimum of the transmission input speed minus synchronizer speed value is about zero.

* * * * *